United States Patent
Sinclair et al.

(10) Patent No.: US 7,217,753 B2
(45) Date of Patent: May 15, 2007

(54) FIRE RETARDANT INTUMESCENT COATING

(75) Inventors: Michael John Sinclair, Tarporley (GB); James Edward Watts, Kenilworth (GB)

(73) Assignees: Rohm and Haas Company, Philadelphia, PA (US); Chance & Hunt Limited (GB)

( * ) Notice: Subject to any disclaimer, the term of this patent is extended or adjusted under 35 U.S.C. 154(b) by 57 days.

(21) Appl. No.: 10/666,573

(22) Filed: Sep. 19, 2003

(65) Prior Publication Data
US 2005/0101696 A1    May 12, 2005

(30) Foreign Application Priority Data
Mar. 22, 2001  (GB) ............................ 0107172.9
Mar. 22, 2002  (GB) ................... PCT/GB02/01393

(51) Int. Cl.
*C09D 5/18* (2006.01)
*C09K 21/14* (2006.01)

(52) U.S. Cl. ............... 524/414; 524/416; 524/500; 524/541; 524/542

(58) Field of Classification Search .......... 524/414, 524/416, 500, 541
See application file for complete search history.

(56) References Cited

U.S. PATENT DOCUMENTS

| | | | | |
|---|---|---|---|---|
| 3,912,845 A | * | 10/1975 | Roth | 428/524 |
| 4,198,328 A | | 4/1980 | Bertelli et al. | |
| 4,529,467 A | | 7/1985 | Ward et al. | |
| 4,740,527 A | * | 4/1988 | von Bonin | 521/105 |
| 4,767,832 A | * | 8/1988 | Marx | 525/523 |
| 4,772,642 A | | 9/1988 | Staendeke | |
| 5,108,832 A | * | 4/1992 | Nugent et al. | 428/304.4 |
| 5,856,378 A | | 1/1999 | Ring et al. | |

FOREIGN PATENT DOCUMENTS

| | | | |
|---|---|---|---|
| DE | 3622210 A1 | | 1/1988 |
| EP | 924166 | * | 6/1999 |
| EP | 0924166 A1 | | 6/1999 |
| JP | 08-283621 | * | 8/1996 |

OTHER PUBLICATIONS

Patent Abstract of Japan; JP08034659, Sep. 2, 1997; "Flame Retarding Thermoplastic Polymer Composition".
Patent Abstract for Patent for DE 3622210 A1, Jan. 7, 1988.
BASF Technical Information, "Coatings Raw Material" Laropal® A 81, Jun. 1996.
BASF Technical Information, "Coatings Raw Material" Laropal® A101, Jun. 1996.

* cited by examiner

*Primary Examiner*—Irina S. Zemel
(74) *Attorney, Agent, or Firm*—Andrew E. C. Merriam

(57) ABSTRACT

A fire retardant intumescent coating composition comprises:
(a) 30 to 60% by weight of a phosphorous containing material which decomposes to produce phosphoric acid when the coating is exposed to fire;
(b) 10 to 30% by weight of a thermosetting binder;
(c) 2.5 to 10% by weight of a curing agent for the thermosetting binder; and
(d) 5 to 40% by weight of a thermoplastic binder,
wherein the active groups of the thermosetting and thermoplastic binders are chosen so as to impart charring and blowing functions to the intumescent coating composition.

The thermosetting binder is advantageously a hydroxylated thermosetting binder, suitably an epoxy resin.

The thermoplastic binder is advantageously an oxygenated heterocyclic thermoplastic binder, suitably an aldehyde and/or ketone resin.

The coating composition may contain 1 to 10% by weight of a colouring agent, suitably titanium dioxide.

The coating composition may contain 0.1 to 10% by weight of melt viscosity modifier, suitably hydrogenated castor oil.

15 Claims, No Drawings

FIRE RETARDANT INTUMESCENT COATING

This patent application is a §371 national stage of International Application No. PCT/GB02/01393, filed Mar. 22, 2002, and this patent application claims the benefit of priority under 37 CFR 1.55(a)(1)(ii) of the earlier filed foreign application no. GB 0107172.9, filed on 22 Mar. 2001.

This invention relates to fire retardant intumescent coatings.

The use of steel framework as a method of building construction is commonplace. Much of the world's steel production goes into building construction. Steel framed buildings offer many advantages over traditional methods of construction but suffer one major disadvantage, namely that in the event of fire in the building the temperature of unprotected steel quickly increases to a point where the steel "softens", loses its rigidity and compromises the integrity of the structure. With time, the building will collapse but long before this happens the flexing of the structure will cause panelling, cladding etc to break loose posing a significant hazard to people trying to evacuate the building and to fire fighters trying to contain the blaze.

The simplest way to try to overcome the above mentioned disadvantages of steel framework is in some way to insulate the steel. The degree of insulation affects the time taken to reach the point when the structure becomes unstable and various ratings are arrived at using official tests, e.g. British Standard fire tests. The majority of structural steel requires a one hour fire rating.

There are a number of insulation systems in common usage but they can be summarised under the following three headings, namely mineral insulants, cementitious sprays and intumescent coatings.

This invention relates to intumescent coatings and to methods of preparing and using the same.

To intumesce means to swell and to char. In simple terms, when exposed to heat, intumescent coatings form a thick highly insulative foam on the surface of the steel. The major benefit of these intumescent materials over the various other options available is that under normal conditions they take up virtually no space (typical coating thicknesses are in the region of 1 mm) and they add virtually no additional weight to the structure. Intumescent coatings have been available commercially for many years. Initially they were based on solvented paint systems and, more recently aqueous systems have been developed. The majority of intumescent coatings require a primer coat, several passes of intumescent material in order to build up the required thickness of material, and a finishing coat to improve weatherability. In general, intumescent systems are "soft" and therefore easily damaged.

Traditionally the steel structure has been built and then the intumescent coating applied to the finished structure. There are significant advantages however with "off-site" application of the coating but conventional intumescent systems have proved difficult and slow to apply as well as requiring significant reinstatement work once erected.

In conventional intumescent coatings, the intumescent part of the fire resistant coating system comprises three distinct components, namely a catalyst, a charring agent and a blowing agent.

The catalyst is a compound which decomposes to provide a source of phosphoric acid (such as a sodium, potassium or ammonium salt, e.g. ammonium polyphosphate).

The charring or char forming agent, also known as a carbonific, can be a polyhydric alcohol such as pentaerythritol or dipentaeryiritol or mixtures thereof. The carbonaceous char is obtained on decomposition of the polyhydric alcohol.

The blowing agent produces a non-flammable gas (e.g. $N_2$) when subjected to heat or flame Typical blowing agents include melamine and urea. The blowing agent serves to make the carbonaceous char foam.

It is thought that the ammonium polyphosphate and the polyhydric alcohol react to give a phosphate ester.

In a fire, the above materials decompose and intumesce resulting in the formation of a non-flammable barrier which insulates the coated object from the heat of the fire.

In conventional coatings the three component intumescent material is mixed with an organic polymeric binder. Suitable binders are natural or synthetic rubbers, PVC, polyurethane and polyester, phenolic and acrylic resins. The polymeric binder material can include amongst other things, a rheology modifier and a filler (e.g. $TiO_2$).

Additives may be included in the intumescent/binder mixture, e.g. calcined clay (for char stabilisation), silica, aluminium trihydrate.

It is an object of the present invention to provide a fire retardant intumescent coating which overcomes at least some of the problems associated with prior art fire resistant materials.

These problems are most commonly:

The time associated with the application of the required thicknesses of conventional coatings.

The extended drying time associated with conventional coatings.

The lack of durability of conventional coatings.

The poor physical characteristics of conventional coatings.

According to the present invention there is provided a fire retardant intumescent coating composition comprising:
(a) 30 to 60% by weight of a phosphorous containing material which decomposes to produce phosphoric acid when the coating is exposed to fire;
(b) 10 to 30% by weight of a thermosetting binder;
(c) 2.5 to 10% by weight of a curing agent for the thermosetting binder; and
(d) 5 to 40% by weight of a thermoplastic binder, wherein the active groups of the thermosetting and thermoplastic binders are chosen so as to impart charring and blowing functions to the intumescent coating composition.

Preferably, the phosphorous containing material is a sodium, potassium or ammonium polyphosphate.

Further preferably, the thermosetting binder is a hydroxylated thermosetting resin, suitably an epoxy resin.

The curing agent for the thermosetting binder preferably is a phenolic curing agent.

The thermoplastic resin, preferably, is an oxygenated heterocyclic thermoplastic resin, suitably an aldehyde and/or a ketone resin.

The fire retardant intumescent coating composition of the invention may contain 0.1 to 10% by weight of a melt viscosity modifer, suitably hydrogenated castor oil.

The fire retardant intumescent coating composition of the invention may also contain 1 to 10% by weight of a colouring agent, suitably titanium dioxide.

From another aspect, the present invention is a fire retardant intumescent coating comprising the following components:
(a) 30 to 60% by light of a phosphorous containing material which decomposes to produce phosphoric acid when the coating is exposed to fire;

(b) 10 to 30% by weight of a thermosetting binder;
(c) 2.5 to 10% by weight of a curing agent for the thermosetting binder;
(d) 5 to 40% by weight of a thermoplastic binder;
(e) 0 to 10% by weight of a melt viscosity modifier; and
(f) 0 to 10% by weight of a colouring agent in which (a)–(f) must always add up to 100% by weight and wherein the active groups of the thermosetting resin and the thermoplastic resin are chosen so as to provide charring and blowing functions to the intumescent coating composition.

The intumescent coating of the invention does not necessarily require a carbonific (charring agent) such as pentaerythritol or a blowing agent such as melamine because the binder system of the coating of the invention contains similar active groups as these conventional materials. In conventional intumescent coatings, the phosphoric acid from the catalyst has easy access to the primary alcohols and the carbon atoms of the pentaerythritol.

In the absence of primary alcohols from pentaerythritol, when the ammonium polyphosphate decomposes, the phosphoric acid generated reacts with active groups in the binder system. The thermosetting and thermoplastic ingredients of the binder acts as a carbonific and thus form a carbonaceous char. Also, the reaction of the phosphoric acid with active groups in the binder system produces carbon dioxide and water which are evolved as gases and there is enough gas to act as a blowing agent to foam the carbonaceous char. Essentially, the carbonific and the blowing agent of the conventional intumescent coatings have been replaced by a binder system that effectively contains active groups similar to the traditional active materials, pentaerythritol and melamine. When the thermoplastic material, for example, is an aldehyde and/or a ketone resin it can fulfil the same purpose as the hydroxylated thermosetting resin. Other thermoplastic resins which fulfil said purpose can be used.

Possible ingredients of the coating composition of the invention are as follows:

(a) A preferred phosphorous containing material which decomposes on contacting fire is ammonium polyphosphate obtainable as EXOLIT™ AP462 and AP422 from Clariant.

(b) A hydroxylated thermosetting resin is a preferred binder component. The preferred thermosetting resins are epoxy resins and a suitable epoxy resin is a diglycidyl ether of bisphenol A (Molecular Weight approximately 1800) known as 663 UE obtainable from the Dow Chemical Company. The thermosetting resin also serves to control the stiffness of the coating.

(c) A suitable curing agent (epoxy hardener) for the thermosetting epoxy resin is a phenolic resin DEH 82 which again is obtainable from the Dow Chemical Company.

(d) Preferred thermoplastic binders are aldehyde and ketone resins. A suitable aldehyde resin is LAROPAL™ A81 and a further suitable aldehyde resin is LAROPAL™ A101 both obtainable from BASF. A81 and A101 aldehyde resins have a very low melt viscosity which can assist the extruder processing of the coating ingredients. The A81 resin and/or A101 gives plasticity to the binder system and this increased plasticity makes for easier foaming of the carbonaceous material when formed.

(e) The optional melt viscosity modifier is an extrusion aid, e.g. hydrogenated castor oil obtainable as THIXCIN™ from Rheox. The hydrogenated castor oil reduces the viscosity of the binder system during the extrusion process and during the coalescence phase of the curing cycle.

(f) A colouring agent may be included in the coating composition to impart colour and opacity to the paint. The white pigment titanium dioxide can be used and since titanium dioxide is a high temperature resistant mineral (manufactured by calcination at approximately 1000° C.) it also assists in maintaining the structure of the char.

(g) Other materials which can be included in the coating composition of the invention are:
  (i) china clay (e.g. bentonite) as a stabilising agent;
  (ii) melamine phosphate as a stabilising agent, additional blowing agent and additional source of phosphorous material;
  (iii) vitrifiers, e.g. zinc borate;
  (iv) metal salts to impart various properties; and
  (v) melamine to give enhanced blowing effect.

Important advantages are obtained by doing away with separate carbonific and the blowing agents. For example, conventional systems use as little as 5% by weight binder so as to accommodate the carbonific and the blowing agent. In the coating composition of the present invention, preferably above 30% by weight of the composition is the binder system and we have found that below 25% by weight binder system a coherent coating is not obtained. In other words, doing away with the separate carbonific and blowing agent allows increased binder system content. This in turn significantly improves the physical characteristics of the coating (e.g. film formation, strength, impact resistance, chemical resistance, general appearance) and allows a thermosetting composition to be formulated which can be applied and cured to full hardness within a period of only a few hours.

In order to obtain the best results from the intumescent coating of the invention it is necessary to bind the ingredients of the coating into a system that is capable of (a) being processed through an extruder; (b) being ground to a powder which will melt and coalesce during application to the material being protected; and (c) reacting so that it will not melt and reflow when it gets heated in a fire.

Important factors required in order to obtain the advantages of the intumescent powder coating composition of the invention include:

(i) Achieving the correct balance between the thermoset and the thermoplastic characteristics. The thermoset resin is required to prevent the paint from sagging and running away during a fire. The thermoplastic resin has the flexibility to be able to foam.

(ii) Achieving a suitable viscosity for the binder mix during processing through the extruder. The higher the viscosity, the higher the processing temperature attained during extrusion If the processing temperature exceeds 170° C. there is a possibility of product breakdown.

(iii) The reaction of the thermoset for coating formation should occur at about 160° C. and in a reasonable time.

The above factors are important in choosing the optimum binding system.

Embodiments of the invention will now be described by way of example.

Successful formulations of the intumescent coating formulation of the invention are set forth in the table below.

| Ex | Epoxy Resin | Phenolic Curing Agent | Aldehyde Resin | THIXCIN ™ | Ammonium Poly-phosphate | TiO$_2$ |
|---|---|---|---|---|---|---|
| 1 | 18.0 | 6.0 | 10.0 | 3.5 | 55.0 | 7.5 |
| 2 | 18.0 | 6.0 | 10.0 | 3.5 | 57.5 | 5.0 |
| 3 | 15.0 | 5.0 | 14.0 | 3.5 | 57.5 | 5.0 |
| 4 | 18.0 | 6.0 | 6.5 | 7.0 | 57.5 | 5.0 |
| 5 | 16.5 | 5.5 | 8.5 | 7.0 | 57.5 | 5.0 |
| 6 | 22.5 | 7.5 | 15 | — | 50.0 | 5.0 |

Figures are in wt %.

Indicative testing of the above formulations showed the following approximate increases in volume due to foam formation:

Ex. 1—22 times original coating depth
Ex. 2—26 times original coating depth
Ex. 3—30 times original coating depth
Ex. 4—15 times original coating depth
Ex. 5—25 times original coating depth
Ex. 6—28 times original coating depth The aldehyde resin of the above Examples can be replaced with a ketone resin to give similar effects.

Procedure for Testing Coated Steel Panels

The ingredients of the coating formulation in powder form were premixed and fed into a Werner and Pfleiderer extruder ZSK30 set at 90° C. and running at 300 rpm. The extrudate was collected and cooled. It was then ground through a Pallmann PP18 mill.

The ground powder was sieved through a 500 micron sieve to remove coarse particles. The powder was then applied to pre-heated steel test panels using a Nordson electrostatic spray gun. The coating was cured for a minimum of 10 minutes at 160° C. The coating thickness was determined using a 355 Elcometer digital thickness gauge range 0 mm to 5 mm.

Testing of the coated panels was carried out in a 1 m$^3$ test furnace set to follow the BS 476 Cellulostic curve and the panels were mounted in four(4) separate apertures in the furnace set at 90 degrees to the burner. Approximate panel size was 275 mm×275 mm×7 mm and the area exposed to the furnace was approximately 250 mm×250 mm.

Test Results:

| Formulation | Mean thickness (microns) | Back of panel temperature (degrees Centigrade) | | | |
|---|---|---|---|---|---|
| | | 30 minutes | 60 minutes | 90 minutes | 120 minutes |
| Ex. 1 | 2870 | 200 | 251 | 292 | 321 |
| Ex. 1 | 2450 | 214 | 270 | 309 | 328 |
| Ex. 2 | 2715 | 192 | 232 | 263 | 283 |
| Ex. 2 | 1700 | 294 | 341 | 379 | 611 |

This data confirms the ability of the intumescent foams to insulate a substrate.

NB: The Association of Specialist Fire Protection (ASFP) quote the following;

"When fully stressed in accordance with the design standards used in the UK, either BS449 or BS5950 part 1, steel will lose its design safety margin at temperatures around 550° C."

INDUSTRIAL SCALE APPLICATION OF INTUMESCENT COATING

The steel substrate is pre-heated to a temperature just below the activation temperature of the intumescent powder formulation and the heat within the steel is used to coalesce the intumescent powder formulation as it is applied to the steel.

The purpose of pre-heating the steel is to allow the particles of thermosetting resin to melt and coalesce on to the surface of the steel. This prevents an electrically insulated layer developing which would prevent the addition of further particles to the coating. This in turn allows much greater thicknesses of coating to be applied at one pass than would otherwise be possible.

Although the intumescent coating of the invention has been described with reference to the protection of structural steel it could potentially be used whenever there is a requirement to reduce the transfer of heat from a fire through a metal substrate. These applications could include fire doors, vehicle passenger compartments, aircraft passenger and cargo areas, aircraft galley equipment, railway and underground carriages, cable trays (to prevent both loss of signal through the cable and passage of fire/heat along the cable tray itself), marine bulkheads and compressed gas canisters.

The invention claimed is:

1. A fire retardant intumescent coating composition selected from the group consisting of powder coating compositions and, aqueous coating compositions, said composition comprising:
   (a) 30 to 60% by weight of a phosphorous containing material which decomposes to produce phosphoric acid when the coating is exposed to fire;
   (b) 10 to 30% by weight of a thermosetting binder;
   (c) 2.5 to 10% by weight of a curing agent for the thermosetting binder; and
   (d) 5 to 40% by weight of a thermoplastic binder,
wherein each of the thermosetting and thermoplastic binders comprise groups that react with the said phosphoric acid, thereby imparting charring and blowing functions to the intumescent coating composition.

2. A fire retardant intumescent coating composition according to claim 1 wherein the total weight of the said thermosetting and thermoplastic binder accounts for 30% or more by weight of the composition.

3. A fire retardant intumescent coating composition according to claim 1 wherein the phosphorous containing material is a sodium, potassium or ammonium polyphosphate.

4. A fire retardant intumescent coating composition according to claim 1 wherein the thermosetting binder is a hydroxylated thermosetting resin.

5. A fire retardant intumescent coating composition according to any one of claims 1 to 4 wherein the thermosetting binder is an epoxy resin.

6. A fire retardant intumescent coating composition according to claim 1 wherein the curing agent for the thermosetting binder is a phenolic curing agent.

7. A fire retardant intumescent composition according to claim 1 wherein the thermoplastic binder is an aldehyde or ketone resin.

8. A fire retardant intumescent coating composition according to claim 1 containing 0.1 to 10% by weight of a melt viscosity modifier.

9. A fire retardant intumescent coating composition according to claim 8 wherein the melt viscosity modifier is hydrogenated castor oil.

10. A fire retardant intumescent coating composition according to claim 1 containing 1 to 10% by weight of a colouring agent.

11. A fire retardant intumescent coating composition according to claim 10 wherein the colouring agent is titanium dioxide.

12. A fire retardant intumescent coating composition according to claim 1 containing one or more additives selected from the group consisting of a china clay, melamine phosphate, vitriflers, metal salts and melamine.

13. A fire retardant intumescent powder coating composition as claimed in claim 1
further wherein, the said composition is made by a process comprising premixing the said components (a)–(d), extruding the premix, and grinding the thus formed extrudate to form a powder.

14. A composition according to claim 13 wherein the thermoplastic binder is an oxygenated heterocyclic thermoplastic resin.

15. A composition according to claim 14 wherein the thermoplastic resin is an aldehyde or ketone resin.

* * * * *